(12) United States Patent
Glejbøl

(10) Patent No.: US 9,989,183 B2
(45) Date of Patent: Jun. 5, 2018

(54) UNBONDED FLEXIBLE PIPE AND AN OFFSHORE SYSTEM COMPRISING AN UNBONDED FLEXIBLE PIPE

(71) Applicant: National Oilwell Varco Denmark I/S, Brondby (DK)

(72) Inventor: Kristian Glejbøl, Glostrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 176 days.

(21) Appl. No.: 14/908,255

(22) PCT Filed: Apr. 23, 2014

(86) PCT No.: PCT/DK2014/050109
§ 371 (c)(1),
(2) Date: Jan. 28, 2016

(87) PCT Pub. No.: WO2015/014365
PCT Pub. Date: Feb. 5, 2015

(65) Prior Publication Data
US 2016/0178106 A1 Jun. 23, 2016

(30) Foreign Application Priority Data

Aug. 2, 2013 (DK) .................................. 2013 70431

(51) Int. Cl.
*F16L 11/00* (2006.01)
*F16L 53/00* (2018.01)
(Continued)

(52) U.S. Cl.
CPC .......... *F16L 53/004* (2013.01); *F16L 11/081* (2013.01); *F16L 11/127* (2013.01); *F16L 25/01* (2013.01);
(Continued)

(58) Field of Classification Search
CPC ........ F16L 11/127; F16L 11/083; F16L 25/01; F16L 53/008
(Continued)

(56) References Cited

U.S. PATENT DOCUMENTS 5,289,561 A * 2/1994 Costa Filho .......... F16L 11/127
137/341
6,315,497 B1 11/2001 Wittman
(Continued)

FOREIGN PATENT DOCUMENTS

EP 0 478 519 A1 4/1992
EP 0 485 220 B1 5/1992
(Continued)

OTHER PUBLICATIONS

"Recommended Practice for Flexible Pipe"; ANSI/API Recommended Practice 17B, Fourth Edition; Jul. 2008.
(Continued)

*Primary Examiner* — Patrick F Brinson
(74) *Attorney, Agent, or Firm* — Pearne & Gordon LLP

(57) ABSTRACT

An unbonded flexible pipe for offshore transportation of fluids from a subsea facility. The unbonded flexible pipe has a length along a longitudinal center axis, and a first and a second end, and a first end fitting connected to the first end. The unbonded flexible pipe comprises from inside and out an electrically conductive carcass, an electrically insulating innermost sealing sheath, at least one electrically conductive armor layer comprising at least one helically wound electrically conductive wire and an electrically insulating outer sealing sheath. At least the electrically conductive layers are mechanically terminated in the first end fitting and the pipe comprises electrical connections arranged to apply a voltage over the electrically conductive layers which electrically conductive layers are electrically connected at a distance
(Continued)

along the length of the unbonded flexible pipe from the first end fitting of the unbonded flexible pipe to provide an electric circuit.

23 Claims, 11 Drawing Sheets

(51) Int. Cl.
    *F16L 11/127*     (2006.01)
    *F16L 25/01*     (2006.01)
    *F16L 33/01*     (2006.01)
    *F16L 11/08*     (2006.01)

(52) U.S. Cl.
    CPC ............. *F16L 33/01* (2013.01); *F16L 53/008* (2013.01); *F16L 11/083* (2013.01)

(58) Field of Classification Search
    USPC .............. 138/109, 134, 131, 139; 285/222.1, 285/334.1, 334.5
    See application file for complete search history.

(56) References Cited

U.S. PATENT DOCUMENTS

| | | | | |
|---|---|---|---|---|
| 6,360,781 | B1* | 3/2002 | Braad | ...................... F16L 25/08 138/109 |
| 6,858,117 | B2* | 2/2005 | Berton | ..................... C23F 13/20 204/196.2 |
| 7,123,826 | B2 | 10/2006 | Belcher | |
| 2012/0217000 | A1 | 8/2012 | Bremnes | |
| 2014/0069542 | A1* | 3/2014 | Graham | ................... G01M 3/40 138/104 |
| 2015/0252929 | A1* | 9/2015 | Jaspaert | .................. B29C 65/42 285/41 |
| 2017/0159866 | A1* | 6/2017 | Glejbol | ................. F16L 53/007 |

FOREIGN PATENT DOCUMENTS

| | | |
|---|---|---|
| EP | 0 616 166 B1 | 9/1994 |
| EP | 2 493 262 A1 | 8/2012 |
| GB | 2 084 284 B | 4/1982 |
| GB | 2 244 179 B | 11/1991 |
| GB | 2480072 A | 11/2011 |
| WO | 89/11616 A1 | 11/1989 |
| WO | 99/19656 A1 | 4/1999 |
| WO | 2007/112785 A1 | 10/2007 |
| WO | 2012/110637 A1 | 8/2012 |

OTHER PUBLICATIONS

"Specification for Unbonded Flexible Pipe"; ANSI/API Specification 17J, Third Edition; Jul. 2008.
Danish Search Report for PA 2013 70431 dated Mar. 20, 2014.

* cited by examiner

UNBONDED FLEXIBLE PIPE AND AN OFFSHORE SYSTEM COMPRISING AN UNBONDED FLEXIBLE PIPE

TECHNICAL FIELD

The invention relates to an unbonded flexible pipe for offshore and subsea transportation of fluids, in particular fluids which solidify if subjected to a temperature drop, such as hydrocarbons, water and mixtures hereof. The invention also relates to an offshore system comprising an unbounded flexible pipe such as a riser pipe and/or a flow line.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an innermost sealing sheath—often referred to as an internal pressure sheath, which forms a barrier against the outflow of the fluid which is conveyed in the bore of the pipe, and one or usually a plurality of armoring layers. Often the pipe further comprises an outer protection layer which provides mechanical protection of the armor layers. The outer protection layer may be a sealing layer sealing against ingress of sea water. In certain unbonded flexible pipes one or more intermediate sealing layers are arranged between armor layers.

In general flexible pipes are expected to have a lifetime of 20 years in operation.

The term "unbonded" means in this text that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass.

These armoring layers comprise or consist of multiple elongated armoring elements that are not bonded to each other directly or indirectly via other layers along the pipe. Thereby the pipe becomes bendable and sufficiently flexible to roll up for transportation.

Unbonded flexible pipes are often used e.g. as riser pipes in the production of oil or other subsea applications. One of the difficulties in the production of crude oil and other fluids from reserves located in deep waters is that the crude oil normally has a temperature which is relatively high compared to the temperature of the surrounding sea water and during transportation from the reservoir to a top-site production platform or when transported in a flow line, the fluid is cooled down to a lower temperature which may increase the viscosity of the fluid or even result in more or less blocking of the pipe due to the formation of hydrates and waxes or other solidified substances.

In order to avoid undesired cooling down of a fluid in an unbonded flexible pipe, it is well known to provide the unbonded flexible pipe with one or more thermal insulation layers. The thermal insulation of subsea pipelines is a practice which in certain situations does not provide a sufficient protection against formation of solidified substances in the fluid, such as in case of temporary production stop. As temporary production stops cannot be fully avoided, it is essential that the pipe system is designed to ensure that the pipe is not blocked by solidified substances during a temporary production stop. Removal of a blocking in a pipe can be very difficult and costly and in worst case it is not possible to remove the blocking and as a result the whole pipe must be replaced.

Several methods of actively heating the pipe have been described in the art. These methods can be categorized in two groups, namely a group using flowing of hot fluids in selected spaces within the pipe wall and a group using electric heating.

EP 485 220 discloses an electric heating system for subsea flexible pipelines which includes the provision of an electric unit consisting of a controlled rectifying unit, which is the source of current, an electric cable positioned in parallel with the flexible pipeline for the return of the current, and two terminal connectors which electrically isolate the double-reinforced crossed armoring, the electric current being conducted by the tensile armoring or the carcass and returning by an electric cable installed outside the flexible pipeline.

U.S. Pat. No. 7,123,826 discloses a pipe comprising a tubular member formed of a plastic material, and a plurality of electrical current conductive materials dispersed in the plastic material for increasing the electrical conductivity of the tubular layer, so that when electrical power is supplied to the conductor, the current flows through the materials to heat the pipe and the fluids.

US 2012/0217000 discloses a system for electrical heating of risers or pipes which has at least two concentric layers of metal wires adapted to be used for low-voltage direct electric heating (LV-DEH), each pair being provided to heat a specific segment of a riser or a pipe. The system can be used for both the pipeline and the riser up to a top site structure.

In principle the prior art systems provide suitable methods of heating the pipeline. However, there is still a need for an unbonded flexible pipe and an offshore system with such a pipe which provide both a good protection against blocking of the pipe in the event of a temporary production stop while simultaneously being simple and safe.

DISCLOSURE OF INVENTION

An object of the present invention is to provide an unbonded flexible pipe suitable for use as a riser or a flowline for transporting fluids from a subsea facility e.g. to a top site structure or along the seabed in a flowline, where the pipe can be subjected to electric heating in a simple and cost effective way.

Another object of the present invention is to provide an unbonded flexible pipe suitable for use in transporting fluids from a subsea facility, where the pipe in case of a temporary production stop can be subjected to an electric heating while simultaneously having low risk of side effects due to the application of current.

A further object of the present invention is to provide an offshore system comprising an unbonded flexible pipe and being suitable for use as a riser or a flowline for transporting fluids from a subsea facility to a production site structure, where the pipe in case of a temporary production stop can be subjected to an electric heating in a simple and cost effective way and with low risk of undesired side effects due to application of current.

These objects have been solved by the invention as defined in the claims and described herein.

It has been found that the invention and/or embodiments thereof have a number of additional advantages which will be clear to the skilled person from the following description.

The unbonded flexible pipe of the invention is in particular in the form of an unbounded flexible pipe for transportation of fluids from a subsea facility to a production site structure.

As defined in the present application the unbounded flexible pipe comprises at least a first end-fitting and preferable a second end-fitting and optionally intermediate end-fittings interconnecting sections of the pipe.

In an embodiment the unbonded flexible pipe is suitable for transporting fluid between a top site structure and a subsea facility, where the top site structure is arranged at a relatively vertically higher position than the subsea facility. The top site structure can for example be a floating unit such as a floating platform or a vessel or a stationary unit. The top site structure will usually be arranged near the water line, such as within from about 25 m above the water line to about 100 m below the water line.

In an embodiment the unbonded flexible pipe is suitable for transporting fluid along the seabed in a flow line from a subsea facility to a production site structure.

The production site structure can be a top site structure as defined herein, but it can also be any other structure arranged subsea e.g. an intermediate container or another transportation pipe.

The term "water line" means the water line at still water. Unless specifically mentioned all distances and determinations in relation to the water line are made at still water at average water level.

The term "in radial direction" means a direction from the axis of the pipe and radially outwards.

The terms "inside" and "outside" a layer of the pipe are used to designate the relative distance to the axis of the pipe, such that "inside a layer" means the area encircled by the layer i.e. with a shorter axial distance than the layer and "outside a layer" means the area not encircled by the layer and not contained by the layer, i.e. with a shorter axial distance than the layer.

The term "substantially" should herein be taken to mean that ordinary product variances and tolerances are comprised.

The term "cross-wound layers" means that the layers comprise wound elongate elements that are wound in opposite direction relatively to the longitudinal axis of the pipe where the angle to the longitudinal axis can be equal or different from each other.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term 'seabed' is generally used to demote the subsea floor.

The unbonded flexible pipe has a length along its longitudinal center axis, and a first and a second end. The unbonded flexible pipe further comprises a first end fitting connected to the first end. Usually the unbonded flexible pipe will also comprise a second end fitting connected to the second end thereof.

In an embodiment the first end of the pipe is the end of the pipe arranged to be remote from the subsea facility relative to the second end thereof, i.e. the fluid is arranged to flow from the second end towards the first end of the unbounded flexible pipe.

End fittings are well known in the art and are usually required to have a high strength. Normally such end fittings are mainly of metal. The first end fitting and the second end fitting can for example be as the end fittings known in the art with the modification with respect to electrically conductive pathways and electrical insulations described herein.

The unbonded flexible pipe comprises from inside and out an electrically conductive carcass, an electrically insulating innermost sealing sheath, at least one electrically conductive armor layer comprising at least one helically wound electrically conductive wire and an electrically insulating outer sealing sheath.

At least the electrically conductive layers are mechanically terminated in the first end fitting and the pipe comprises electrical connections in the first end fitting arranged to apply a voltage using a main power supply over the electrically conductive layers. These electrically conductive layers are electrically interconnected at a distance along the length of the unbonded flexible pipe from the first end fitting of the unbonded flexible pipe to provide an electric circuit when the power supply is applied. The position along unbounded flexible pipe and its respective layers where the electrically conductive layers are electrically interconnected is referred to as the far position.

The main power supply constitutes or form part of an electrical heating system.

By applying a voltage over the electrically conductive layers a current will run through the carcass and return at least partly via the at least one electrically conductive armor layer. Thereby—do to the electrical resistance of the material of the electrically conductive layers; heat will be generated as the current passes through the material and because the electrically conductive carcass and the electrically conductive armor layer are selected such that a voltage drop $V_c$ over the electrically conductive carcass is larger than a voltage drop $V_a$ over the electrically conductive armor layer most of the heat will be generated in the carcass and the current required to avoid solidifying of substances in the bore or to remove such solids can therefore be kept relatively low and thereby any risk of undesired side effects provided by such current is even more low.

Thereby any fluids or any solidified fluids within the bore of the pipe can in a simple way be heated to the desired temperature e.g. in case of a temporary production stop. No additional layers or additional conductors running external to the pipe are required and the required amount of current can be kept low. Thereby an ordinary unbonded flexible pipe with metal armor layer(s) and metal carcass can in a simple way be modified to an unbonded flexible pipe of the present invention simply by providing one or more of its end fittings with the required electrical properties as described herein.

The invention thereby provides a very simple and cost effective way of subjecting the unbonded flexible pipe to electric heating e.g. in case of a temporary production stop, thereby preventing the pipe from being blocked due to undesired cooling. Further it has been found that the risk of side effects due to the application of current can be held relatively low e.g. as described further below.

The electrically conductive carcass has a resistance $R_c$ and the electrically conductive armor layer has a resistance $R_a$. The current through the circuit comprising the main power supply, the electrically conductive carcass and the electrically conductive armor layer can be determined according to the equation:

$$I = V_c/R_c = V_a/R_a$$

Wherein $V_c + V_a$ is the impressed voltage V and $V_c$ is the voltage drop over the carcass and $V_a$ is the voltage drop over the electrically conductive armor layer.

To ensure that the main amount of power is allocated in the carcass the electrically conductive carcass and the electrically conductive armor layer are advantageously selected such that $V_c > V_a$. Preferably $V_c > 1.5$ times $V_a$.

Preferably $V_c > 2$ times $V_a$, such as $V_c > 5$ times $V_a$, such as $V_c > 10$ times $V_a$.

The electrically conductive layers are advantageously of metal. Preferably the carcass is of a material with a relatively high electrical resistance such as steel, preferably highly alloyed steel, in particular stainless steels or nickel based alloys. The structure of the carcass is advantageously as the structures known from prior art carcass structures. Advantageously the materials of the carcass and the armor layer are selected such that the carcass has a higher electrical resistance than the electrically conductive armor layer. In an embodiment the electrically conductive armor layer comprises a support conductor for reducing the electrical resistance. The support conductor is e.g. in the form of a wire or a foil of highly conductive material—e.g. cobber, applied in the whole length of the electrically conductive armor layer In an embodiment the first end fitting has a front end in which the electrically conductive layers are mechanically terminated and a rear end for being connected to a production site structure. The first end fitting comprises a bore extending through the front end and the rear end of the first end fitting. The rear end of the first end fitting comprises a flange for being connected to a production site structure in fluid connection with a flow path thereof. The shape and structure of such mount flange is well known to the skilled person.

In an embodiment the rear end of the first end fitting comprises an annular wall surface defining the rear end of the bore of the first end fitting and the annular wall surface is electrically insulated from the electrically conductive carcass. Usually in prior art end fittings the inner wall surface is of metal in at least a part of the end fitting.

In a preferred embodiment of the invention the entire annular wall surface defining the bore of the first end fitting is provided by a coating of an electrically insulating material. Thereby any risk of galvanic damage of the end fitting is highly reduced or even avoided. And depending on the electrical potential of the end fitting when a voltage is applied over the conductive layers, this electrical insulation can also protect the carcass from corrosion.

Preferably parts of or the entire annular wall surface is electrically insulated in that it is provided by a cover of an electrical insulating material e.g. in the form of a coating.

In an embodiment the annular wall surface is electrically insulated from the electrical conductive carcass fully or partly by being provided by the innermost sealing sheath. Preferably the innermost sealing sheath is fixed in the first end fitting, but extends beyond its fixing area to provide an electrical insulation between the carcass and the metallic parts of the first end fitting. Thereby a very high corrosion protection of the first end fitting and/or the carcass is provided.

Due to the applied voltage any risk of galvanic corrosion of metal parts may be increased and according to the invention it has been found that the major corrosion risk provided by the voltage is in the area around the carcass at the first end fitting and beyond e.g. at the production site structure to where the unbonded flexible pipe is connected. By providing the entire annular wall surface defining the bore of the first end fitting by an electrical insulating material any risk of galvanic corrosion will be substantially reduced or even fully avoided.

In an embodiment an annular wall section at the rear end of the first end fitting is electrically insulated from the electrically conductive carcass by comprising a rear end insulating layer, preferably in the form of an extension of the innermost sealing sheath and/or by a separate rear end electrical insulating layer.

In an embodiment the annular wall section at the rear end of the first end fitting is electrically insulated from the electrically conductive carcass by comprising a rear end epoxy layer or rubber layer.

When a voltage is applied over the electrically conductive layers the carcass may obtain a substantially higher or lower electric potential relative to the annular wall section of the first end fitting. This difference in electric potential could result in a high risk of damaging of the annular wall section at the rear end of the first end fitting or of the carcass due to galvanic corrosion.

In an embodiment where the voltage is applied over the electrically conductive layers such that the carcass has a relatively high electric potential relative to the electrically conductive armor layer. Such high electric potential may without an electric power blocking result in damaging of the annular wall section at the rear end of the first end fitting. As mentioned such end fittings are usually of metal in order to have the sufficient strength. By applying a rear end electrical insulating layer on the annular wall section at the rear end of the first end fitting, such damage by galvanic corrosion can be reduced or even avoided.

In an embodiment where the voltage is applied over the electrically conductive layers such that the carcass has a relative low electric potential, such low electric potential may without an electric power blocking result in damaging of the carcass. By applying a rear end electrical insulating layer on the annular wall section at the rear end of the first end fitting, such damage can be reduced or even avoided.

In an embodiment of the unbonded flexible pipe an electric power blocking is arranged in the rear end of the bore of the end fitting.

When a voltage is applied over the electrically conductive layers, the carcass will—as mentioned—usually have a relatively high electric potential or a relative low electric potential relative to metal parts of the end fitting and/or metal parts of the production site structure. Such electric potential difference may without an electric power blocking likely result in damaging of metal parts of the first end fitting and/or the production site to which the unbonded flexible pipe is connected due to galvanic corrosion. By providing an electric power blocking which reduces galvanic reaction between the carcass and the metal parts of the production site structure, such damage can be reduced or even avoided. Whereas the electrical insulation of the annular wall surface defining the bore of the first end fitting results in a reduced risk of galvanic corrosion, the electric power blocking provides an additional corrosion protection of the whole system including the production site structure to which the unbonded flexible pipe is to be connected.

The electric power blocking can be any kind of physical and/or chemical blocking that blocks field lines from the carcass and with vector direction to the flange of the rear part and/or to the production site structure when mounted thereto.

In an embodiment the electric power blocking is a valve, such as a ball valve or a gate valve, preferably the valve is of nonconductive material or is coated with a nonconductive material.

In an embodiment the electric power blocking is provided by a bend e.g. a fluid trap provided by a J-bend, a U-bend or an S-bend.

In an embodiment the electric power blocking is a sacrificial anode comprising a metal or a metal alloy which is less noble than the annular wall surface of the first end fitting, such as an anode comprising magnesium, brass, aluminum, zinc or titanium. The sacrificial anode can be any kind of sacrificial anode for the material it is supposed to protect.

In an embodiment the sacrificial anode is applied in an annular pattern in an annular wall section at the rear end of the first end fitting. It may for example be applied in the form of a ring partly embedded in the annular wall section.

Sacrificial anodes and offshore sacrificial anodes are well known in the art for use in cathodic protection. In the present situation the sacrificial anode has the function of blocking electric power transmission to the annular wall surface of the first end fitting and/or to any metal that the first end fitting may be connected to, thereby avoiding undesired electrolytic reactions between the carcass and any metal that the first end fitting may be connected to.

The metal anodes are usually made of a metallic element or alloy which corrodes more easily than the metal it protects. The electrons that are removed from the sacrificial anode are conducted to the protected metal, which then becomes the cathode. This cathode is protected from oxidation because reduction (rather than corrosion) occurs on the protected metals.

In some cases, the negative potential of magnesium can be a disadvantage: If the potential of the protected metal becomes too negative, hydrogen ions may be evolved on the carcass surface leading to hydrogen embrittlement which may damage the carcass.

Zinc is normally a reliable material, but where the temperature is too high the zinc tends to become less negative; if this happens, current may cease to flow and the anode stops working.

In an embodiment the sacrificial anode is a plating/electroplating anode. Typically, plating anodes and anodes are made of brass, bronze, cadmium, copper, lead, nickel, tin, or zinc. Alloys for these metal anodes include cadmium-tin, copper-tin, copper-zinc, tin-lead, tin-zinc, zinc-aluminum, zinc-magnesium, and zinc-nickel.

In an embodiment the sacrificial anode is a mixed metal oxide (MMO) anode. An MMO anode comprises an oxide coating over an inert metal or carbon core. The oxides consist of precious metal (Ru, Ir, Pt) oxides for catalyzing an electrolysis reaction. Titanium oxides are used for inertness, electrode corrosion protection, and lower cost. The core metals are typically titanium (most common), zirconium, niobium, or tantalum.

For a structure operating in sea water, zero potential (or "earth") is generally equal to the potential of the sea water and is herein defined as the potential of the sea water.

As mentioned above, when a voltage is impressed over the electrically conductive layers using the main power supply, at least one of the electrically conductive layers and usually the carcass will usually have a relatively high electric potential or a relative low electric potential relative to zero.

For example the main power supply can be connected to provide the carcass with a relatively high or relatively low potential and the electrically conductive armor layer can be connected to zero.

In an embodiment one of the electrically conductive layers is impressed by a high potential and the other one is impressed by a low potential. For example the carcass is impressed by 100 V and the electrically conductive armor layer is impressed by −100 V using the sea water potential as zero. Thereby a voltage drop of 200 V can be provided and at the far end i.e. at the second end preferably with the second end-fitting the voltage is relatively low. This is an advantage since no or only little protection at the second end against galvanic corrosion will be desired or required.

In an embodiment the impressed voltage by the main power supply is adjusted such that the voltage drop over the carcass relative to the voltage drop over the electrically conductive armor layer ensure that the potential at the far position at the second end of the unbounded flexible pipe is substantially zero.

In an embodiment the electrically conductive armor layer and/or the electrically conductive armor layer is adapted to be grounded preferably at the far position of the unbonded flexible pipe.

The main power supply can be applied as a single power supply or it can be in the form of two or more electrically cooperating and/or connected sub-power supplies. In an embodiment the main power supply is a dual power supply wherein one sub-power supply is connected over one of the electrically conductive layers and zero and it adds a high potential to said one of the electrically conductive layers and another sub-power supply is connected over the other one of the electrically conductive layers and zero and it adds a low potential to said other one of the electrically conductive layers.

In an embodiment the risk of galvanic corrosion of metal parts is at least partly alleviated by applying a support power supply in the electric circuit at a distance from the main power supply. Such support power supply is advantageously applied at the far position of the unbounded flexible pipe, preferably at the second end of the unbounded flexible pipe for example in the second end-fitting.

The support power supply advantageously impresses an electrical potential difference between the electrically conductive layers at the second end of the unbounded flexible pipe such that the impressed electrical potential at the second end of each of the respective electrically conductive layers is negative where the electrical potential impressed by the main power supply at the first end of the unbounded flexible pipe to each of said respective electrically conductive layers is positive and positive where the electrical potential impressed by the main power supply at the first end of the unbounded flexible pipe to each of said respective electrically conductive layers is negative.

The circuit is advantageously formed by the carcass at the first end of the pipe (C1), the carcass at the second end of the pipe (C2), the electrically conductive armor layer at the second end of the pipe (A2) and the electrically conductive armor layer at the first end of the pipe (A1), where an electrical potential difference between C1 and A1 is impressed by the main power supply and an electrical potential difference between C2 and A2 is impressed by the support power supply. In an embodiment the electrical potential of C1 and A2 is positive and the electrical potential of A1 and C2 is negative. In an alternative embodiment the electrical potential of C1 and A2 is negative and the electrical potential of A1 and C2 is positive.

In an embodiment where alternating power supplies are used the power supplies are synchronizes such that when A1 and C2 is negative C1 and A2 will be positive and when A1 and C2 is positive C1 and A2 will be negative In an embodiment two or more support power supplies are provided in the circuit.

Preferably at least one of the electrical connections for connecting to the main power supply is arranged in the first end fitting. In an embodiment both of the electrical connections are arranged in the first end fitting.

In an embodiment both of the electrical connections for connecting to the main power supply are arranged in the first end fitting such that a high electric potential is impressed at the carcass and a low electric potential is impressed at the electrically conductive armor layer by the main power supply. Advantageously the electrically conductive armor layer is grounded at a distance from the first end fitting, such as in or near the second end fitting.

In order to provide a relatively long section of the unbonded flexible pipe with a heating function (i.e. with the electric circuit provided by the electrically conductive layers and one or more power supplies) it is generally desired that the electrically conductive carcass is electrically connected with the electrically conductive armor layer at a distance of at least about 5 m, such as at least about 10 m, such as at least about 30 m along the length of the unbonded flexible pipe from the first end fitting. In some situations it will be sufficient to have the heating function in only a length section of the unbonded flexible pipe, such as an uppermost length section, whereas in other situations the unbonded flexible pipe advantageously has the heating function in its entire length.

In an embodiment the unbonded flexible pipe comprises a second end fitting connected to its second end. Advantageously the electrically conductive carcass is electrically connected with the electrically conductive armor layer in the second end fitting optionally via a support power supply as described above. The interconnection between the carcass and the electrically conductive armor layer can be provided by a simple conductive connection in the second end fitting.

In an embodiment the interconnection between the carcass and the electrically conductive armor layer can be provided by a short circuiting arrangement e.g. by having only a very thin insulation between the carcass and the electrically conductive armor layer in the second end-fitting or by having an on-off switch in the second end-fitting. In the same way an on-off switch between the main power supply and the respective electrically conductive layer or layers can be arranged in the first end-fitting.

Preferably at least the electrically conductive layers are mechanically terminated in the second end fitting and an electrical connection is provided between the electrically conductive carcass and the electrically conductive armor layer.

In an embodiment the electrical connections arranged to apply a voltage over the electrically conductive layers are arranged to be connected to a main power supply in the form of an electric heating system for impressing the voltage over the electrically conductive layers in the first end fitting.

In an embodiment the electrical connections arranged to apply a voltage over the electrically conductive layers are arranged for application of an alternating voltage.

The electrically conductive armor layer is in an embodiment adapted to be grounded for example in its first end thereby reducing the electric field generated from the electrically conductive armor layer since its electric potential will be held relatively close to the electric potential of the surrounding water when the unbounded flexible pipe is in use. In an embodiment the electrically conductive armor layer has a relatively low electrical resistance compared to the carcass, meaning that most of the effect will be allocated to the carcass and the major voltage drop will be applied over the carcass along its length. Simultaneously most of the heat will be generated in the carcass. To reduce the resistance of the electrically conductive armor layer, this armor layer may e.g. comprise threads or coatings of copper or other highly conducting material e.g. as described above.

In an embodiment the electrical connections arranged to apply a voltage over the electrically conductive layers are arranged for application of direct voltage (DC).

In an embodiment where the electrically conductive armor layer is adapted to be grounded, the grounding is applied to the electrically conductive armor layer via the first end fitting.

In an embodiment the electrical connections arranged to apply a voltage over the electrically conductive layers comprise a single voltage conductor electrically connected to the carcass, and the electrically conductive armor layer is grounded such that the AC or DC return current is guided through the earth and/or through the electrically conductive armor layer.

Different approaches for supplying power to the pipe can be pursued. If a constant power level is required to the pipe, the pipe can be feed a simple ac current. For this purpose the coupling to the grid can be accomplished using a simple impedance matching transformer. If the same power supply is to be used for different pipes, or if the power level for the pipe is to be regulated, it has proved advantageous to rectify the current and feed it to the pipe using a PWM regulation.

It has proven advantageous to monitor the shift of temperature during heating. Attempt to measure the temperature directly on the carcass of the pipe has shown not to be optimal, much better results is found by measuring the temperature in the pipe annulus. As the heat generated in the pipe bore only diffuses slowly towards the annulus, there is a latency between heat input and heat detection. In this situation it is sometimes advantageous to heat the pipe for a shorter period of time and wait until the heat reaches the thermal detection system before next heat pulse is initiated. Heating according to this scheme typically involves a frequency of about 0.05 to about 1 heat pulse per minute with a duty time of from about 20% to about 80% such as about 50%. An additional advantage of the pulsed heating scheme is that generated heat can diffuse along the length of the pipe, hereby effectively preventing the formation of hotspots.

In an embodiment the pulsed power may be pulsing between a high power level and a low power level wherein the low power level can be from about 90% of the high power level to zero, such as from about 50% to about 10% of the high power level. In an embodiment the pulsing frequency is from about 30 to about 360 high power pulses per minute.

In an embodiment the unbonded flexible pipe comprises two or more pipe length sections which are mechanically and electrically connected via respective intermediate end fittings.

Advantageously each pipe length section comprises from inside and out an electrically conductive carcass length section, an electrically insulating innermost sealing sheath length section, at least one armor layer length section comprising a length section of the at least one helically wound electrically conductive wire and an electrically insulating outer sealing sheath length section, wherein the respective length sections of the conductive layers are electrically interconnected to provide the electric circuit.

In an embodiment one or more of the length sections of layers are mechanically terminated in the respective intermediate end fittings.

Advantageously at least the carcass length sections are not electrically terminated in two or more of the intermediate end fittings.

In an embodiment at least the carcass length sections are not terminated in two or more of the intermediate end fittings. In this embodiment the carcass is not mechanically terminated in two interconnected intermediate end fittings but extends through these intermediate end fittings while other layers of the respective sections of the pipe which are radially outside the carcass may be mechanically terminated in these intermediate end fittings.

In an embodiment the carcass length sections and the innermost sealing sheath length sections are not terminated in two or more of the intermediate end fittings. Preferably the carcass length sections and the innermost sealing sheath length sections are not terminated in any of the intermediate end fittings.

The unbonded flexible pipe can comprise any other layers which are usual for unbonded flexible pipes, such as additional armor layers, additional sealing layers or gas barrier layers or similar.

In an embodiment the unbonded flexible pipe in at least a length section thereof comprises one or more thermal insulation layers. The thermal insulation layer can be any kind of thermal insulation layer advantageously applied between the innermost sealing sheath and the electrically conductive armor layer.

The unbonded flexible pipe advantageously comprises a plurality of armor layers e.g. as described in "Recommended Practice for Flexible Pipe", ANSI/API 17 B, fourth Edition, July 2008, and the standard "Specification for Unbonded Flexible Pipe", ANSI/API 17J, Third edition, July 2008.

Advantageously the unbonded flexible pipe comprises at least a pair of cross wound tensile armor layers, each comprising a plurality of helically wound elongate armor elements preferably of metal. In an embodiment one or both of the tensile armor layers are electrically conductive armor layers where the major part or all of the elongate armor elements are electrically conductive.

Even where the voltage is applied over the one or more helically wound armor layers a magnetic field can be avoided to be generated in the bore of the pipe because the electric conducting layers can be arranged coaxially to prevent generation of such magnetic field.

In an embodiment the unbonded flexible pipe comprises a pressure armor layer comprising at least one helically wound elongate armor element preferably of metal.

In an embodiment the voltage is applied over the carcass and a combined electrical pathway is provided by the tensile armor layers and the pressure armor.

In an embodiment the unbonded flexible pipe comprises a temperature sensor, such as a temperature sensor comprising an optical fiber. Such temperature sensors are well known to the skilled person. The temperature sensor is preferably connected to the heating system for controlling the voltage applied over the electrically conductive layers.

The offshore system of the invention comprises a production site structure—e.g. a top site structure or a subsea site structure—and an unbonded flexible pipe suitable for transporting fluids from a subsea facility to the production site structure. The unbonded flexible pipe has a length along a longitudinal center axis, and a first and a second end, and a first end fitting connected to the first end. The unbonded flexible pipe is connected to the production site structure via the first end fitting. The unbonded flexible pipe comprises from inside and out an electrically conductive carcass, an electrically insulating innermost sealing sheath, at least one electrically conductive armor layer comprising at least one helically would electrically conductive wire and an electrically insulating outer sealing sheath. At least the electrically conductive layers are mechanically terminated in the first end fitting. The pipe comprises electrical connections connected to a main power supply for impressing a voltage over the electrically conductive layers. The electrically conductive layers are electrically connected at a distance along the length of the unbonded flexible pipe from the first end fitting of the unbonded flexible pipe to provide an electric circuit.

The unbonded flexible pipe is advantageously as described above. Preferably the unbonded flexible pipe is a riser pipe, a flow line or a combined riser-flowline.

The first end fitting can advantageously be as described above.

In an embodiment the first end fitting comprises a bore extending through a front end in which the electrically conductive layers are mechanically terminated, and through the rear end of the first end fitting, the rear end of the first end fitting comprises the flange and the flange is connected to the production site structure in fluid connection with a flow path thereof.

The flow path of the production site structure is a flow path into which fluids is pumped from the subsea facility, via the unbonded flexible pipe and into the production site structure. The diameter or cross sectional area of the production site structure flow path is preferably corresponding to the diameter or cross sectional area of the bore of the unbonded flexible pipe.

The bore of the unbonded flexible pipe is surrounded by and defined by the innermost sealing sheath.

In an embodiment the rear end of the first end fitting comprises an annular wall surface defining the rear end of the bore of the first end fitting, wherein the entire annular wall surface defining the rear end of the bore of the first end fitting is provided by a coating of an electrically insulating material.

In an embodiment the flow path of the production site structure comprises an inflow flow path section surrounded and defined by an inflow flow path wall surface which in at least a length section is electrically insulated.

In an embodiment the inflow flow path wall surface is electrically insulated in a length section immediately adjacent to the first end fitting. The insulated length section can have any length;

however for providing a good corrosion protection the insulated length section preferably has a length of about 5 cm, such as at least about 10 cm, such as at least about 50 cm.

In an embodiment the electrically insulated length section of the inflow flow path wall surface is electrically insulated by comprising an extension of the innermost sealing sheath of the unbonded flexible pipe. Thereby the innermost sealing sheath and an extension thereof can protect both the annular wall of the rear end of the first end fitting and the inflow flow path wall surface against galvanic corrosion.

In an embodiment the system further comprises an main power supply in the form of a heating system for applying the voltage. The heating system can be any kind of system suitable for applying a voltage over the electrical connections to the electrically conductive layers in the first end fitting. The heating system can e.g. be as described above.

In an embodiment the main power supply is electrically connected to at least one of the electrical connections to the electrically conductive layers in the first end fitting, at least one of the electrical connections is preferably an electrical connection to the carcass.

In an embodiment the main power supply is electrically connected to both of the electrical connections to the electrically conductive layers in the first end fitting.

In an embodiment the main power supply is arranged for application of an alternating voltage. Advantageously the electrically conductive armor layer is grounded, e.g. as described above.

In an embodiment the main power supply is arranged for application of a direct voltage. The system advantageously comprises a grounding preferably applied to the electrically conductive armor layer via the first end fitting.

In an embodiment the system comprises a grounding of the electrically conductive armor layer at a position between the first end fitting and the second end fitting.

In an embodiment the main power supply comprises a single voltage conductor electrically connected to the carcass, and the electrically conductive armor layer being grounded such that the AC or DC return current is guided through the earth and/or through the electrically conductive armor layer.

The main power supply may advantageously be as described above.

In an embodiment the system of the invention comprises a support power supply arranged in the circuit as described above.

In an embodiment the inflow flow path comprises an inflow path section comprising an electric power blocking. The power blocking provides an extra protection against corrosion of metal parts of the production site system. The power blocking is advantageously as described above.

In an embodiment the surfaces in the inflow path section are electrically insulated and preferably the inflow flow path simultaneously comprises an electric power blocking in its inflow path section. Advantageously the surfaces in the inflow path section are electrically insulated in the inflow path length section from the first end fitting and at least to the power blocking.

In an embodiment the electric power blocking is arranged in the inflow path section at a distance from the first end fitting up to about 1 m, such as up to about 0.5 m, such as up to about 30 cm.

In an embodiment the electric power blocking is a valve, such as a ball valve or a gate valve, preferably the valve is of nonconductive material or is coated with a nonconductive material.

In an embodiment the electric power blocking is a sacrificial anode comprising a metal or a metal alloy which is less noble than the annular wall surface of the first end fitting, such as an anode comprising magnesium, brass, aluminum, zinc or titanium. The sacrificial anode is advantageously as described above.

In an embodiment the sacrificial anode is applied in an annular pattern in an annular wall section at the rear end of the first end fitting.

In an embodiment the electric power blocking is at least one bend of the inflow path section, preferably the at least one bend comprises a bend with a bending degree of at least about 90 degrees. Advantageously the electric power blocking comprises two or more bends.

All features of the invention including ranges and preferred ranges can be combined in various ways within the scope of the invention, unless there are specific reasons not to combine such features.

DESCRIPTION OF DRAWINGS

The invention will be explained more fully below in connection with a preferred embodiment and with reference to the drawings in which.

Figure 1:
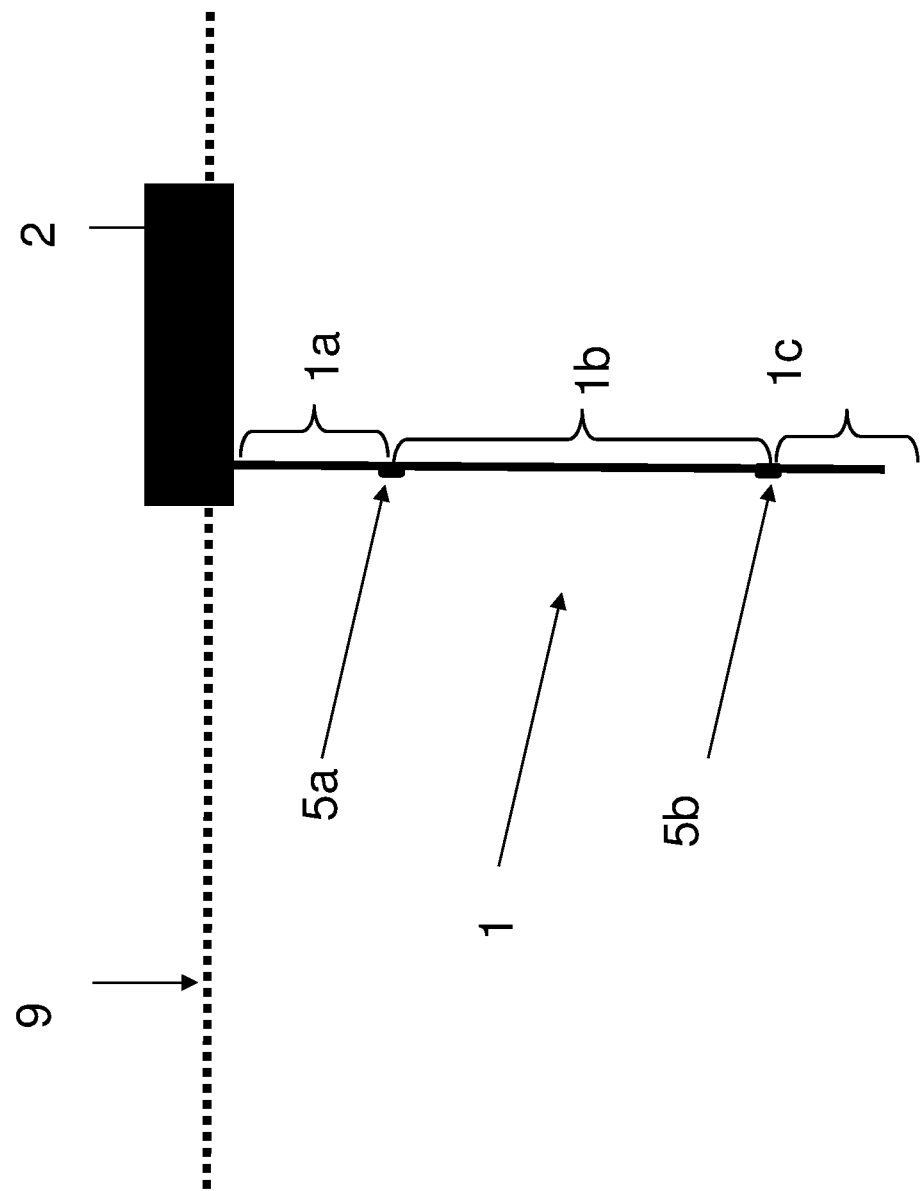
FIG. 1 is a schematic side view of an offshore system comprising an unbonded flexible pipe and a top site structure.

The offshore system of FIG. 1 which is an embodiment of the invention comprises an unbonded flexible pipe 1 and a top site structure 2. The unbonded flexible pipe is arranged for transportation of fluids from a not shown subsea facility to the top site structure 2 which is arranged at the sea surface 9. The top site structure 2 is advantageously a vessel or a platform or an intermediate structure with fluid connection to a vessel or a platform. The unbonded flexible pipe has a first end 3, and a not shown first end fitting connected to the first end 3. The unbonded flexible pipe 1 comprises from inside and out a number of not shown layers comprising an electrically conductive carcass, an electrically insulating innermost sealing sheath, an electrically conductive armor layer comprising a helically wound electrically conductive wire and an electrically insulating outer sealing sheath. The layers of the unbonded flexible pipe 1 are mechanically terminated in the first end fitting and the pipe comprises not shown electrical connections arranged to apply a voltage over the electrically conductive layers which electrically conductive layers are electrically connected at a distance along the length of the unbonded flexible pipe from the first end fitting of the unbonded flexible pipe to provide an electric circuit. The unbonded flexible pipe 1 comprises three pipe length sections 1a, 1b, 1c mechanically interconnected with respective intermediate end fittings 5a, 5b, which intermediate end fittings 5a, 5b advantageously also provide electric interconnections. Preferably the electrically conductive layers are electrically connected in the pipe length section 1c farther from the first end fitting such as in a not shown second end fitting terminating a second end of the unbonded flexible pipe 1.

Figure 2:
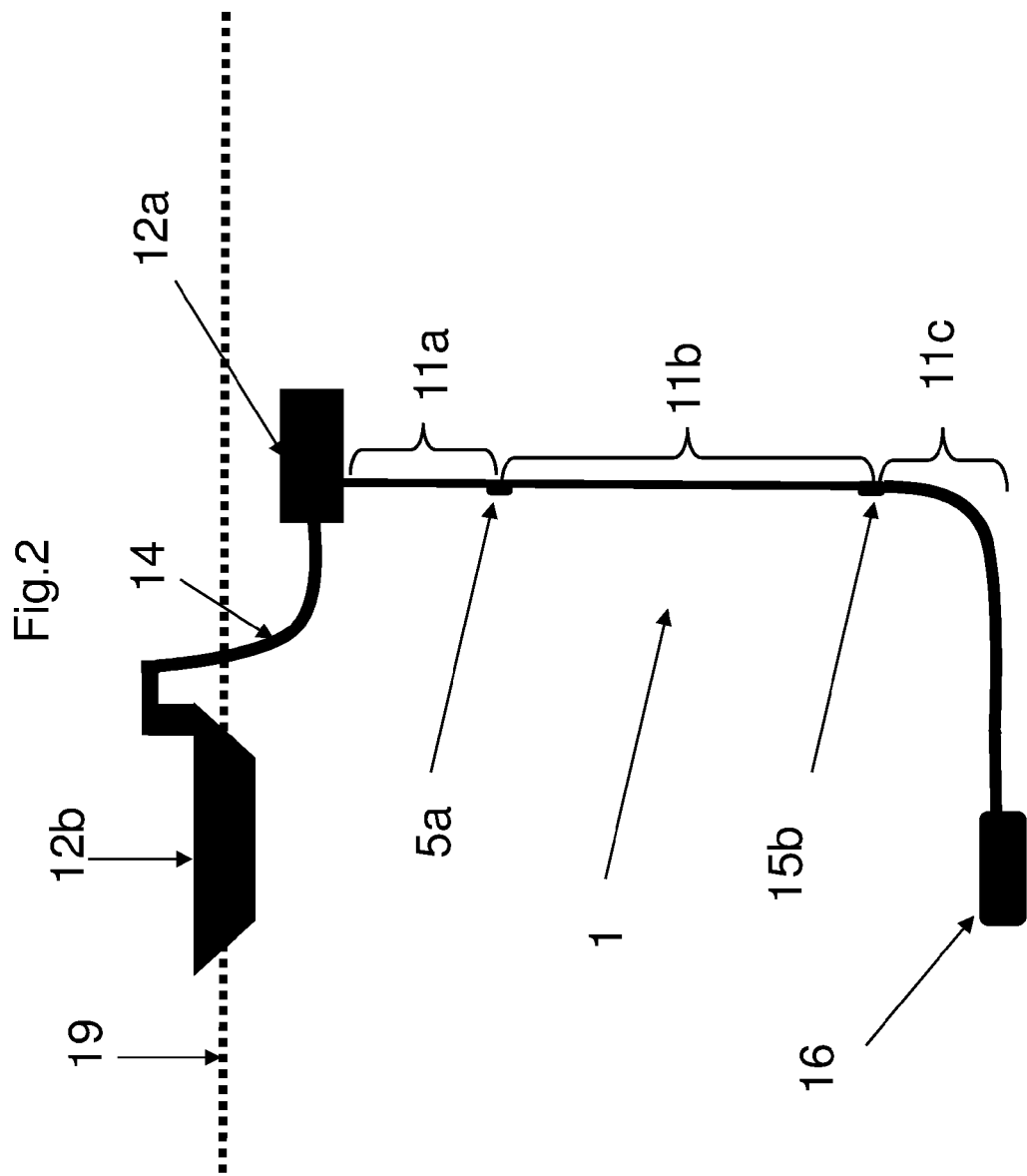
FIG. 2 is a schematic side view of another offshore system comprising an unbonded flexible pipe and a top site structure.

The embodiment of the offshore system shown in FIG. 2 comprises an unbonded flexible pipe 11 and a top site structure 12a. The unbonded flexible pipe 11 is arranged for transportation of fluids from a subsea facility 16 to the top site structure 12a from where the fluids are transported via a top site pipe 4 e.g. a rigid or a flexible jumper, to a vessel 12b floating at the sea surface 19. The unbonded flexible pipe has a first end 13, and a not shown first end fitting connected to the first end 13. The unbonded flexible pipe 11 comprises from inside and out a number of not shown layers comprising an electrically conductive carcass, an electrically insulating innermost sealing sheath, an electrically conductive armor layer comprising a helically wound electrically conductive wire and an electrically insulating outer sealing sheath. The layers of the unbonded flexible pipe 11 are mechanically terminated in the first end fitting and the pipe comprises not shown electrical connections arranged to apply a voltage over the electrically conductive layers which electrically conductive layers are electrically connected at a distance along the length of the unbonded flexible pipe from the first end fitting of the unbonded flexible pipe to provide an electric circuit. The unbonded flexible pipe 11 comprises three pipe length sections 11a, 11b, 11c mechanically interconnected with respective intermediate end fittings 15a, 15b, which intermediate end fittings 15a, 15b advantageously also provide electric interconnections. Preferably the electrically conductive layers are electrically connected in the pipe length section 11c farther from the first end fitting such as in a not shown second end fitting connecting the unbonded flexible pipe 11 to the subsea facility 16.

Figure 3:
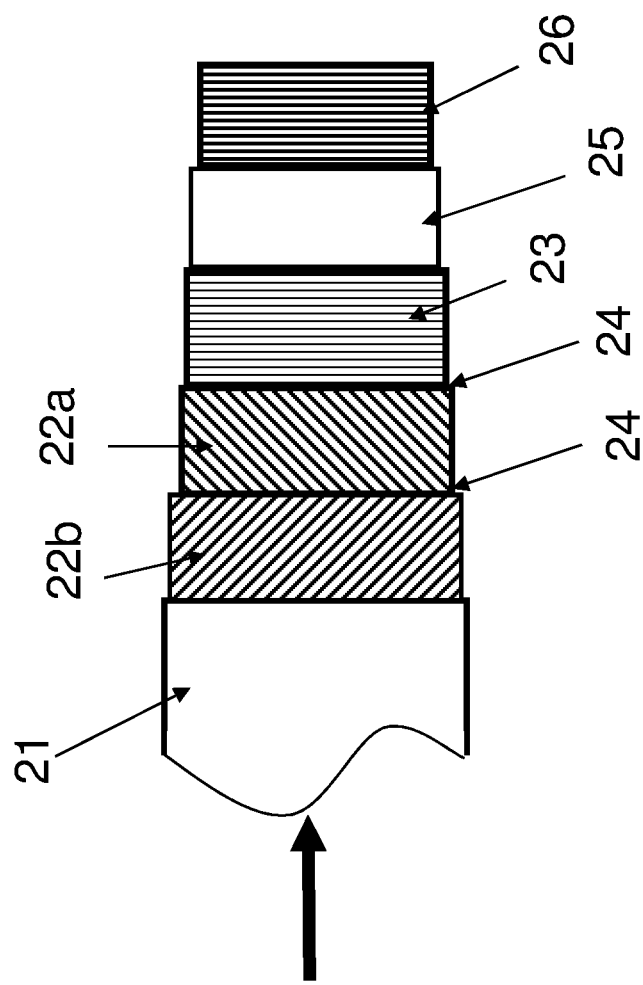
FIG. 3 is a schematic side view of an unbonded flexible pipe where the individually layers of the unbonded flexible pipe are shown.

The unbonded flexible pipe shown in FIG. 3 comprises an innermost sealing sheath 25, e.g. of high density poly ethylene (HDPE), cross linked polyethylene (PEX), Polyvinyldifluorid (PVDF) or polyamide (PA). The innermost sealing sheath 25 is electrically insulating and further has the purpose of preventing outflow of the fluid transferred in the bore of the pipe, indicated by the arrow. Inside the innermost sealing sheath 25 the pipe comprises an electrically conductive carcass 26 which further serves the purpose of reinforcing the pipe against collapse. The carcass 26 is not liquid tight.

On the outer side of the innermost sealing sheath 25, the flexible pipe comprises a pressure armor layer 23, which is e.g. of helically wound armor element(s) of metal or composite material or combinations, which is wound with an angle to the axis of the pipe of about 65 degrees or more e.g. about 85 degrees. The pressure armor layer 23 is not liquid tight.

Outside the pressure armor layer 23, the pipe comprises two cross wound tensile armor layers 22a, 22b wound from elongate armor elements of metal or composite material or combinations. The elongate armor elements on the innermost tensile armor layer 22a are advantageously wound with a winding degree of about 55 degrees or less to the axis of the pipe in a first winding direction and the outermost tensile armor layer 22b is advantageously wound with a winding degree of about 60 degrees or less, such as between about 20 and about 55 degrees to the axis of the pipe in a second winding direction, which is the opposite direction to the first winding direction. The two armor layers with such opposite winding directions are normally referred to as being cross wound. The pipe further comprises an outer sealing sheath 21 protecting the armor layer mechanically and against ingress of sea water and further provides an electrical insulation. At least one of the pressure armor 23 or the tensile armor layers comprising at least one helically wound electrically conductive wire 22a, 22b. As indicated with the reference number 24, the unbonded flexible pipe preferably comprises anti-friction layers between armor layers 23, 22a, 22b. The anti-friction layers are usually not liquid tight and may for example be in the form of a wound film. In an embodiment the unbonded flexible pipe comprises not shown electrical insulation layer(s) between two or more of the armor layers 23, 22a, 22b.

Figure 4:
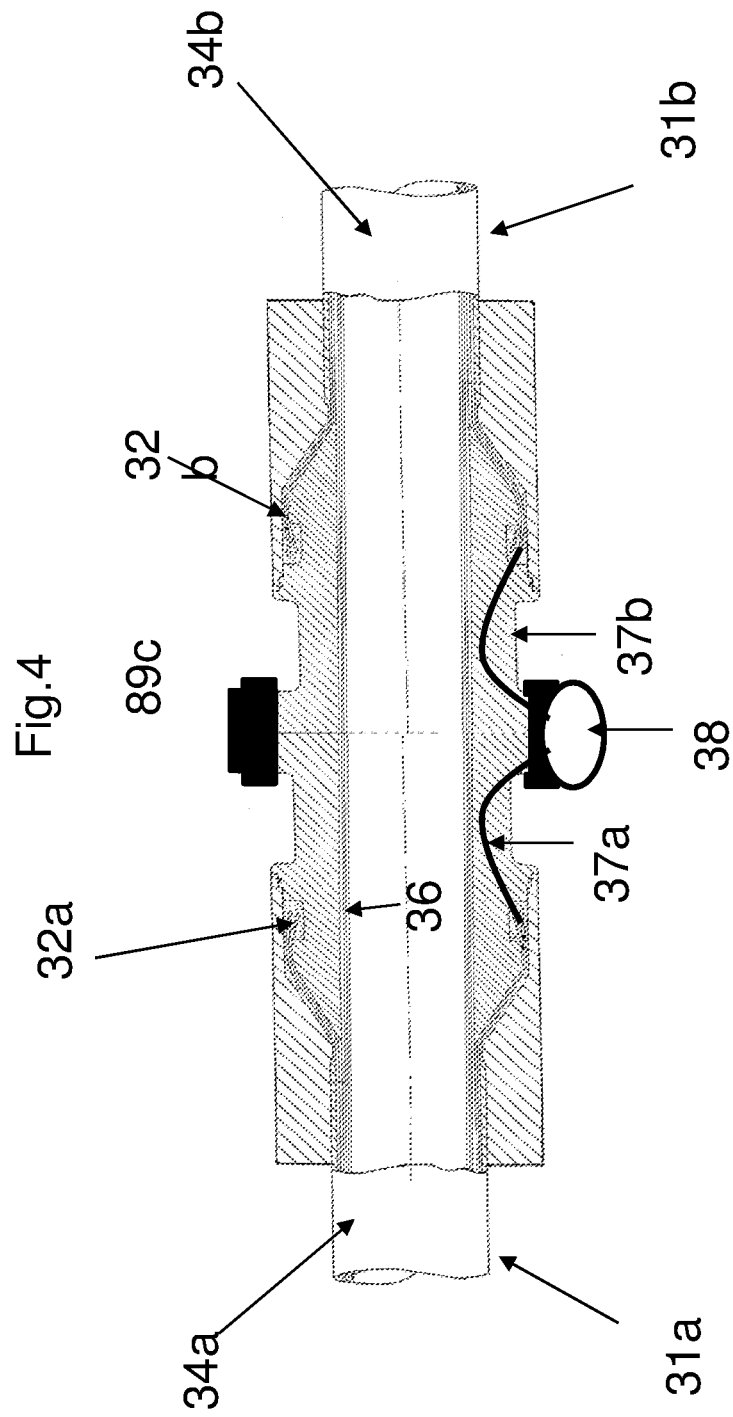
FIG. 4 is a schematic cross-sectional side view of an unbonded flexible pipe comprising an intermediate end fitting.

In the embodiment shown in FIG. 4 the unbonded flexible pipe comprising an intermediate end fitting between a first and a second length section 31a, 31b of the unbonded flexible pipe in which only some of the layers of the unbonded flexible pipe are terminated. The first and a second length section 31a, 31b of the unbonded flexible pipe comprise a number of not terminated layers 36 comprising from inside and out electrically conductive carcass, an electrically insulating innermost sealing sheath and a pressure armor layer. The first and the second length section 31a, 31b of the unbonded flexible pipe comprise each a number of terminated layers comprising from inside and out a pair of cross wound electrically conductive tensile armor layers and an electrically insulating outer sealing sheath 34a, 34b. An electrical insulation intermediate sheath is advantageously arranged to provide an electrical insulation between the pressure armor layer and the tensile armor layers. The electrical insulation intermediate sheath may be a terminated layer or a non-terminated layer provided that it provides the desired electrical insulation. The first and the second length section 31a, 31b can independently of each other comprise one or more additional layers, such as an insulation layer, an additional reinforcing layer etc.

The tensile armor layer 32a of the first length section 31a is electrically connected to the tensile armor layer 32b of the second length section 31b for example as indicated by the wires 37a, 37b which electrically connect the tensile armor layers 32a, 32b to a connecting element 38 which in an embodiment is in the form of a voltage controller and/or a conductor controlling the voltage drop over the tensile armor layers 32a, 32b along the length of the respective length sections.

Figure 5:
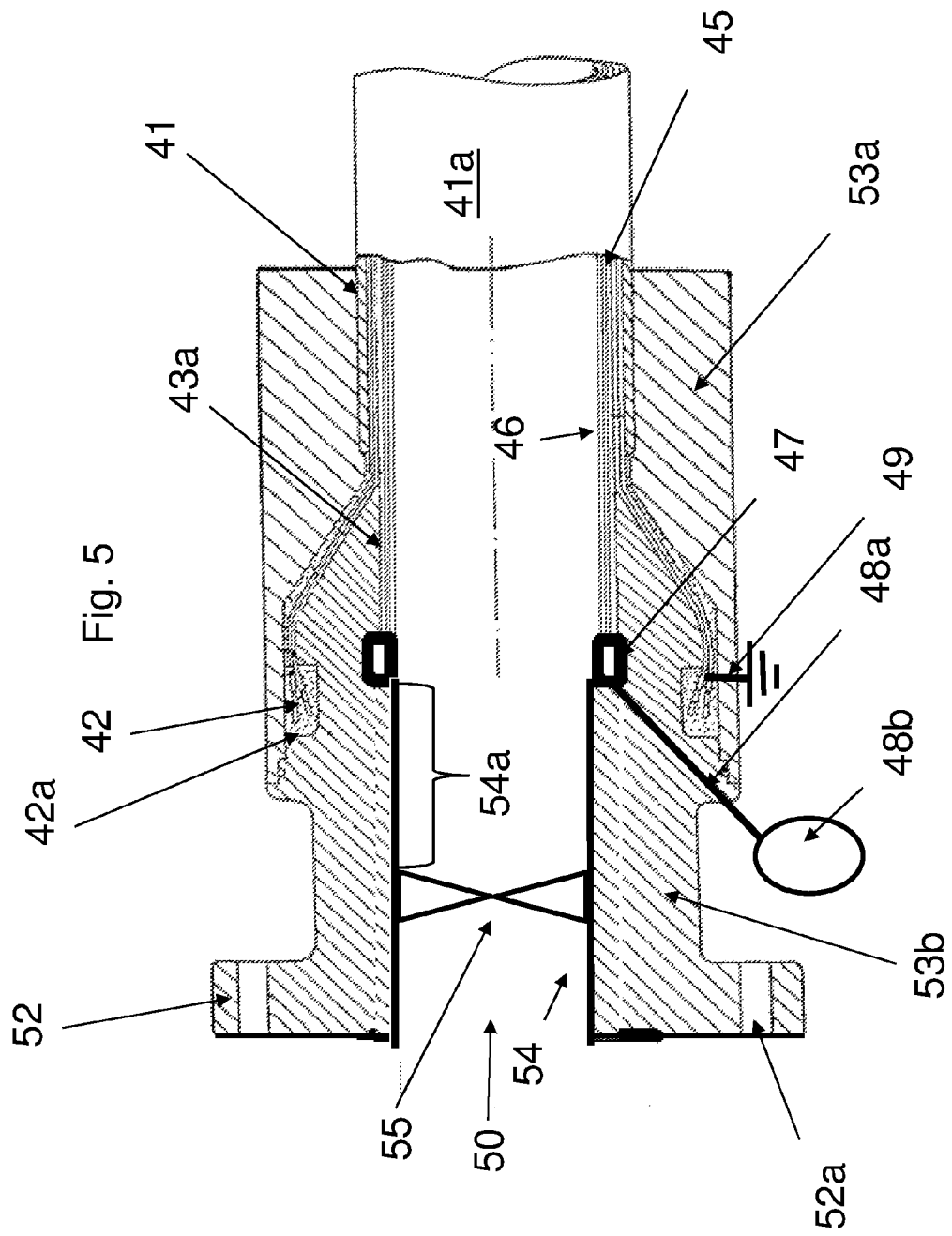
FIG. 5 is a schematic cross-sectional side view of an unbonded flexible pipe comprising a carcass and an armor layer and a first end fitting with electrical connections for applying a voltage over the carcass and the armor layers.

In the embodiment of the invention shown in FIG. 5 only a section of the pipe 41a comprising the first end fitting 43 is shown. The unbonded flexible pipe comprises an electrically conductive carcass 46, an electrically insulating innermost sealing sheath 45, a pair of cross wound electrically conductive tensile armor layers 42 comprising at least one helically wound electrically conductive wire and an electrically insulating outer sealing sheath 41. The unbonded flexible pipe further comprises a pressure armor layer 43a which may also be electrically conductive. In a variation the pressure armor layer 43a is omitted. In another variation an electrically insulating layer is arranged between the pressure armor layer 43a and the pair of cross wound electrically conductive tensile armor layers 42. All of the layers of the unbonded flexible pipe are terminated in the first end fitting 43. The carcass 46, the electrically insulating innermost sealing sheath 45, and the pressure armor layer 43a are securely fixed as indicated with the fixing arrangement 47. The fixing arrangement is preferably arranged to fix each of the layers 46, 45, 43a individually e.g. as known in the art. An electrical connection 48a is arranged to connect the carcass 46 to a conductor 48b, such as a single voltage conductor. In the shown embodiment the connection to the carcass 46 is via the fixing arrangement 47. In a variation the electrical connection 48a is a direct connection to the carcass.

The electrically conductive tensile armor layers 42 are terminated and fixed in a fixing material 42a e.g. epoxy and an electrical connection 49 is arranged to connect the electrically conductive tensile armor layers 42 to ground.

The first end fitting 43 comprises a front end 53a in which the electrically conductive layers are mechanically terminated, and a rear end 53b. The first end fitting 43 has a bore 50 extending through the front end 53a and the rear end 53b.

The rear end 53b of the first end fitting 43 comprises a flange 52 with mounting holes 52a for being connected to a not shown production site structure in fluid connection with a flow path thereof.

The rear end 53b of the first end fitting 43 comprises an annular wall surface 54 defining the rear end of the bore of the first end fitting, wherein at least a part 54a of the annular wall surface rear end 53b of the first end fitting 43 is electrically insulated from the electrically conductive carcass for example by being coated with a non-conducting polymer layer e.g. the part 54a of the annular wall surface rear end 53b is in the form of a wall section at the rear end comprising a rear end insulating layer in the form of an extension of the innermost sealing sheath.

An electric power blocking 55 in the form of a valve 55 is arranged in the rear end of the bore 50 of the end fitting. The valve 55 is arranged immediately adjacent to the insulated part 54a of the annular wall surface rear end 53b.

Figure 6:
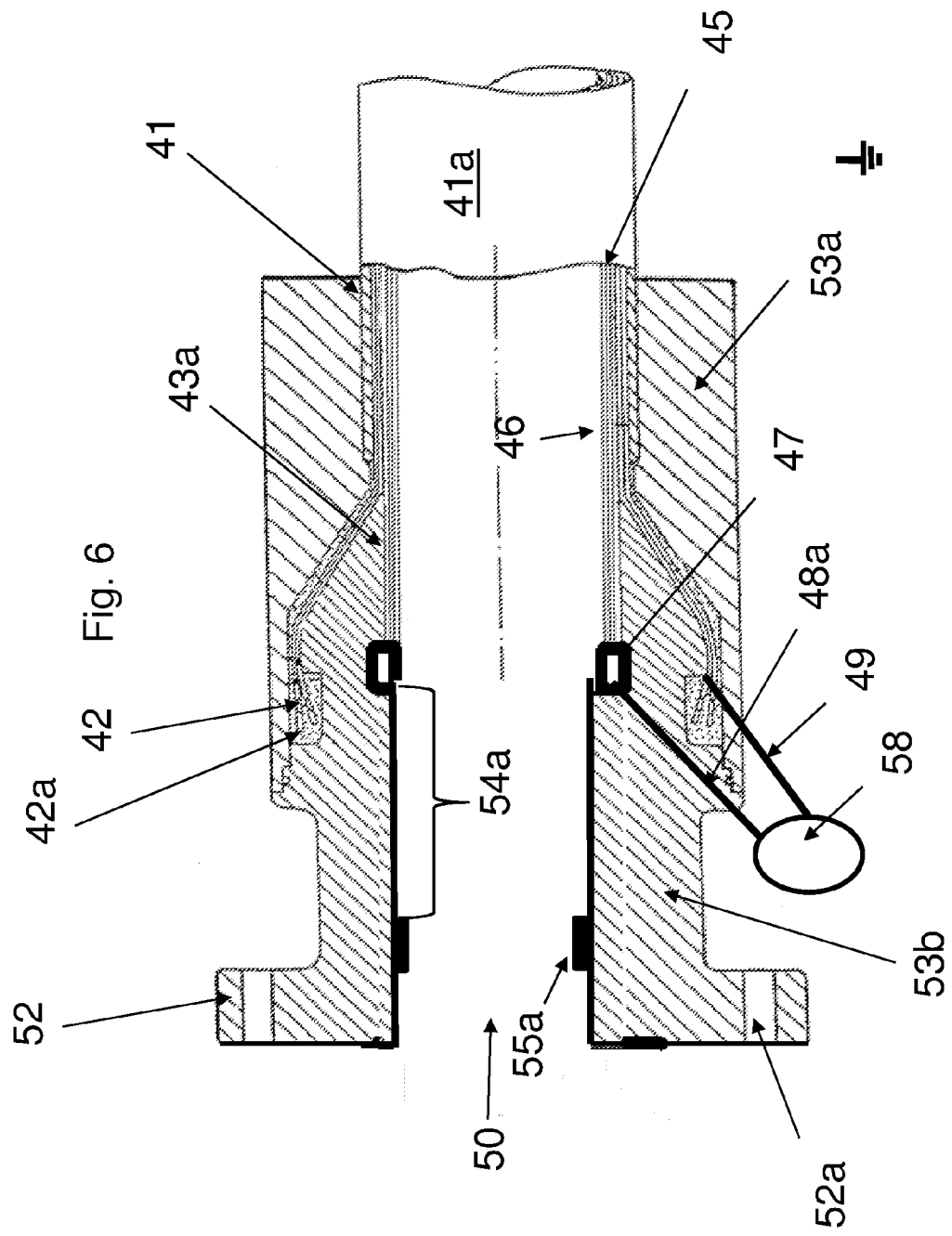
FIG. 6 is a schematic cross-sectional side view of another unbonded flexible pipe comprising a carcass and an armor layer and a first end fitting with electrical connections for applying a voltage over the carcass and the armor layers.

FIG. 6 shows another embodiment of an unbonded flexible pipe of the invention. The embodiment of FIG. 6 is similar to the embodiment of FIG. 5 where it is marked with same reference numbers. In the embodiment of FIG. 6 electrical connection 48a is arranged to connect the carcass 46 to an main power supply 58 and the electrical connection 49 is arranged to connect the electrically conductive tensile armor layers 42 to the main power supply 58. Thereby a voltage can be applied by the main power supply 58.

An electric power blocking 55a in the form of an annular sacrificial anode 55a is arranged in the rear end of the bore 50 of the end fitting. Advantageously the cross wound electrically conductive tensile armor layers 42 are grounded at a position along the length of the unbonded flexible pipe e.g. in a distance of for example at least 10 m from the first end fitting 43.

Figure 7:
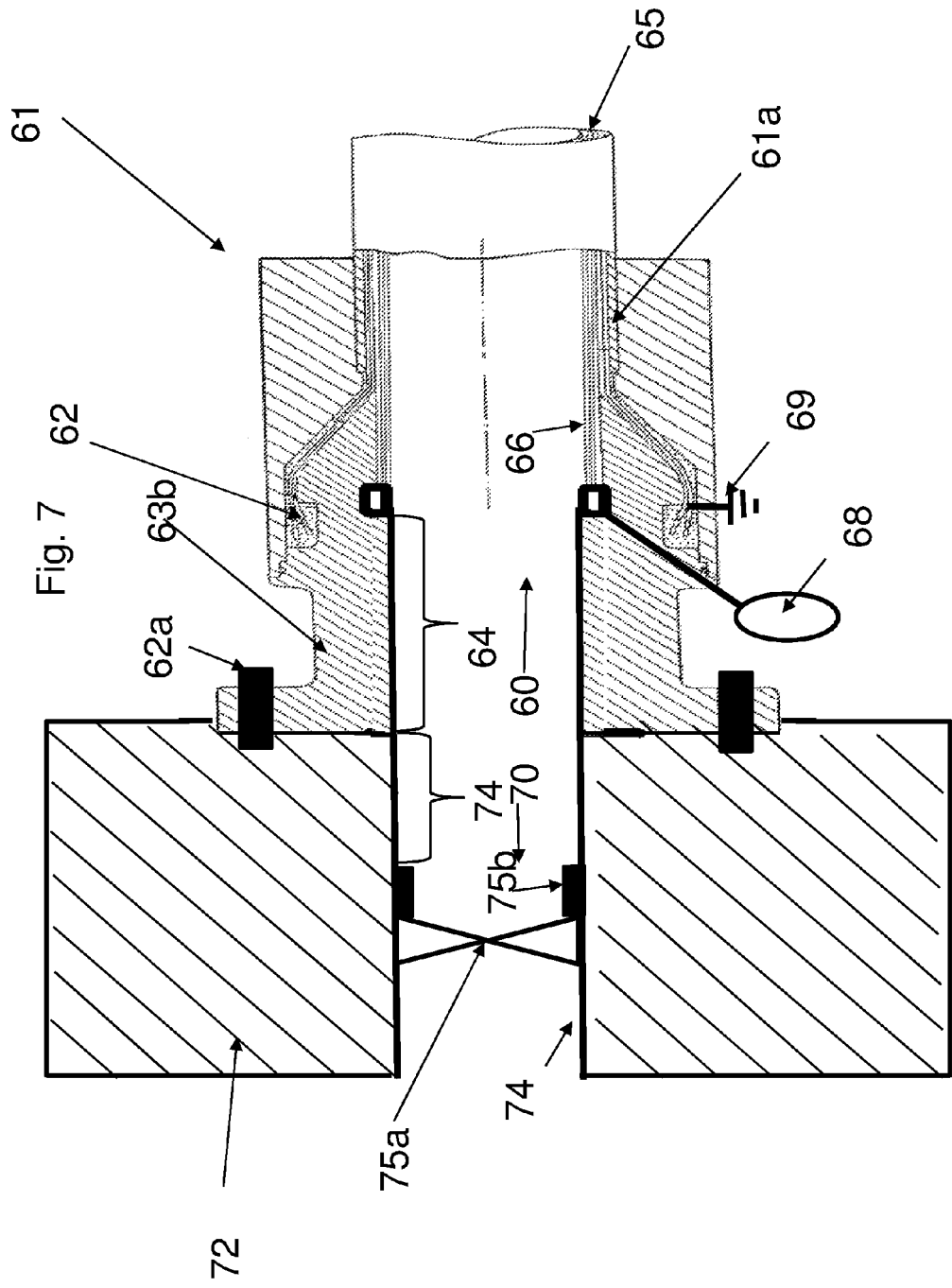
FIG. 7 is a schematic cross-sectional side view of a part of an offshore system comprising an unbonded flexible pipe connected to a production site structure.

In the embodiment of the offshore system of the invention shown in FIG. 7 the offshore system comprises an unbonded flexible pipe 61 comprising a first end fitting 63 connected to a production site structure 72 by connecting elements 62a. The first end fitting 63 comprises a bore and the production site structure 72 comprises an inflow flow path section 70 arranged in fluid connection with the bore 60.

The unbonded flexible pipe comprises from inside and out an electrically conductive carcass 66, an electrically insulating innermost sealing sheath 65, and a pair of cross wound electrically conductive tensile armor layers 62 comprising at least one helically would electrically conductive wire and an electrically insulating outer sealing sheath 61a. The layers are terminated as described in FIG. 5. The electrically conductive carcass 66 is connected to a conductor 68 and the tensile armor layers are grounded 69.

The first end fitting 63 comprises a rear end 63b comprising an annular wall surface 64 defining the rear end of the bore 60 of the first end fitting 63. The entire annular wall surface 64 comprises an electrically insulating coating e.g. in the form of an extension of the electrically insulating innermost sealing sheath 65.

The inflow path section 70 of the production site structure 72 is surrounded by an inflow flow path wall surface 74 which in a length section 74a immediately adjacent to the first end fitting 63 is electrically insulated e.g. by comprising an extension of the innermost sealing sheath 65 of the unbonded flexible pipe 61.

The inflow path section 70 comprises an electric power blocking in the form of a sacrificial anode 75b and a valve 75a.

Figure 8:
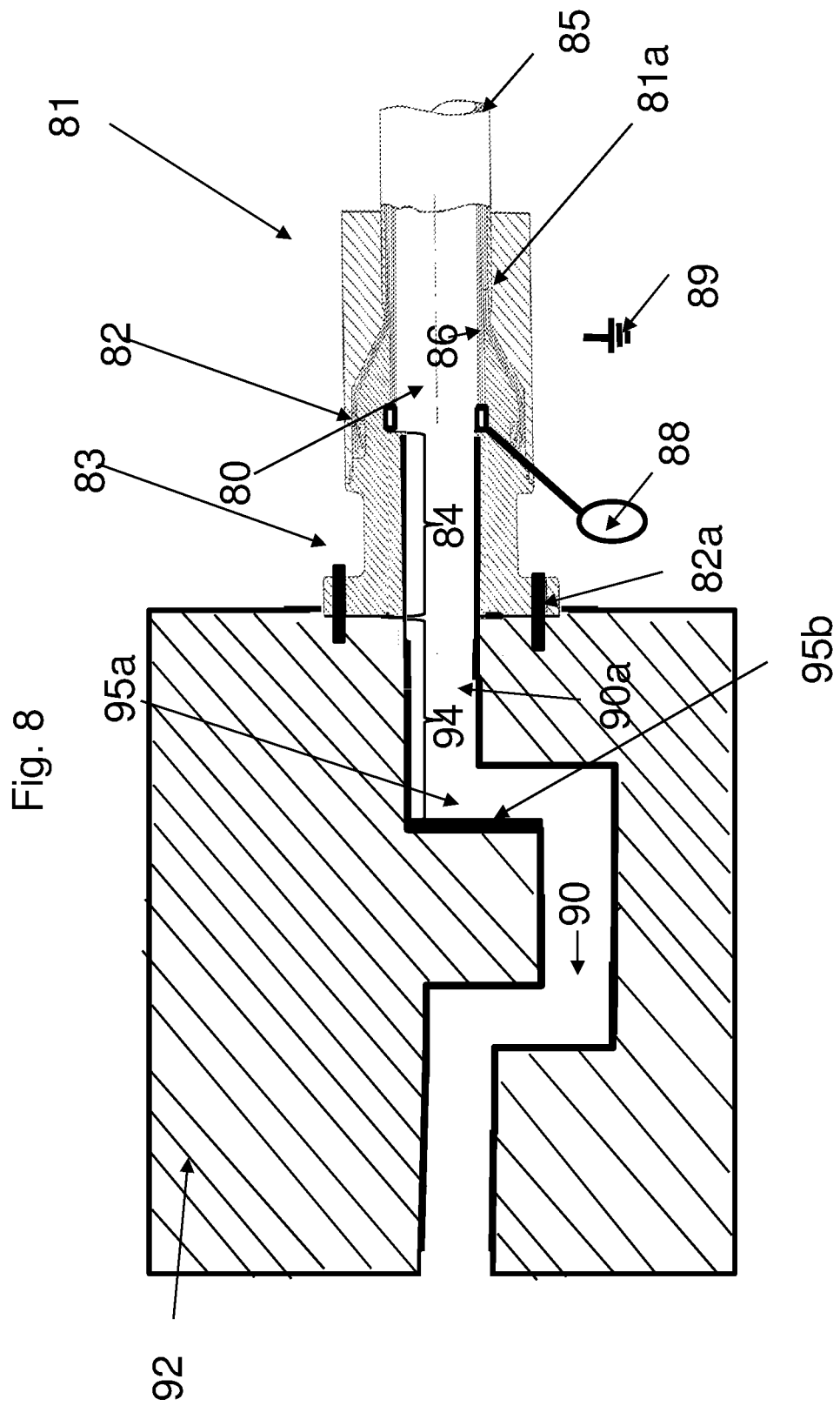
FIG. 8 is a schematic cross-sectional side view of a part of another offshore system comprising an unbonded flexible pipe connected to a production site structure.

In the embodiment of the offshore system of the invention shown in FIG. 8 the production site system comprises an unbonded flexible pipe 81 comprising a first end fitting 83 connected to a production site structure 92 by connecting elements 82a. The first end fitting 83 comprises a bore 80 and the production site structure 92 comprises a flow path 90 with an inflow flow path section 90a arranged in fluid connection with the bore 80.

The unbonded flexible pipe comprises from inside and out an electrically conductive carcass 86, an electrically insulating innermost sealing sheath 85, and a pair of cross wound electrically conductive tensile armor layers 82 comprising at least one helically would electrically conductive wire and an electrically insulating outer sealing sheath 81a. The layers are terminated as described in FIG. 5. An main power supply 88 is arranged to apply a voltage over the carcass 86 and the tensile armor layers 82. The tensile armor layers 82 are advantageously grounded 89 at a distance from the first end fitting 83 e.g. in a not shown second end fitting or in a not shown intermediate end fitting.

The first end fitting 83 comprises a rear end comprising an annular wall surface 84 defining the rear end of the bore 80 of the first end fitting 83. The entire annular wall surface 84 comprises an electrically insulating coating e.g. in the form of an extension of the electrically insulating innermost sealing sheath 85.

The inflow path section 90a of the production site structure 92 is surrounded by an inflow flow path wall surface which in a length section 794 immediately adjacent to the first end fitting 83 is electrically insulated e.g. by comprising an extension of the innermost sealing sheath 85 of the unbonded flexible pipe 81.

The inflow path section 90a comprises an electric power blocking in the form of a bend 95a with a bending degree of about 90 degrees and a sacrificial anode 75b arranged in the bend 95a where turbulent flow can be expected.

Figure 9:
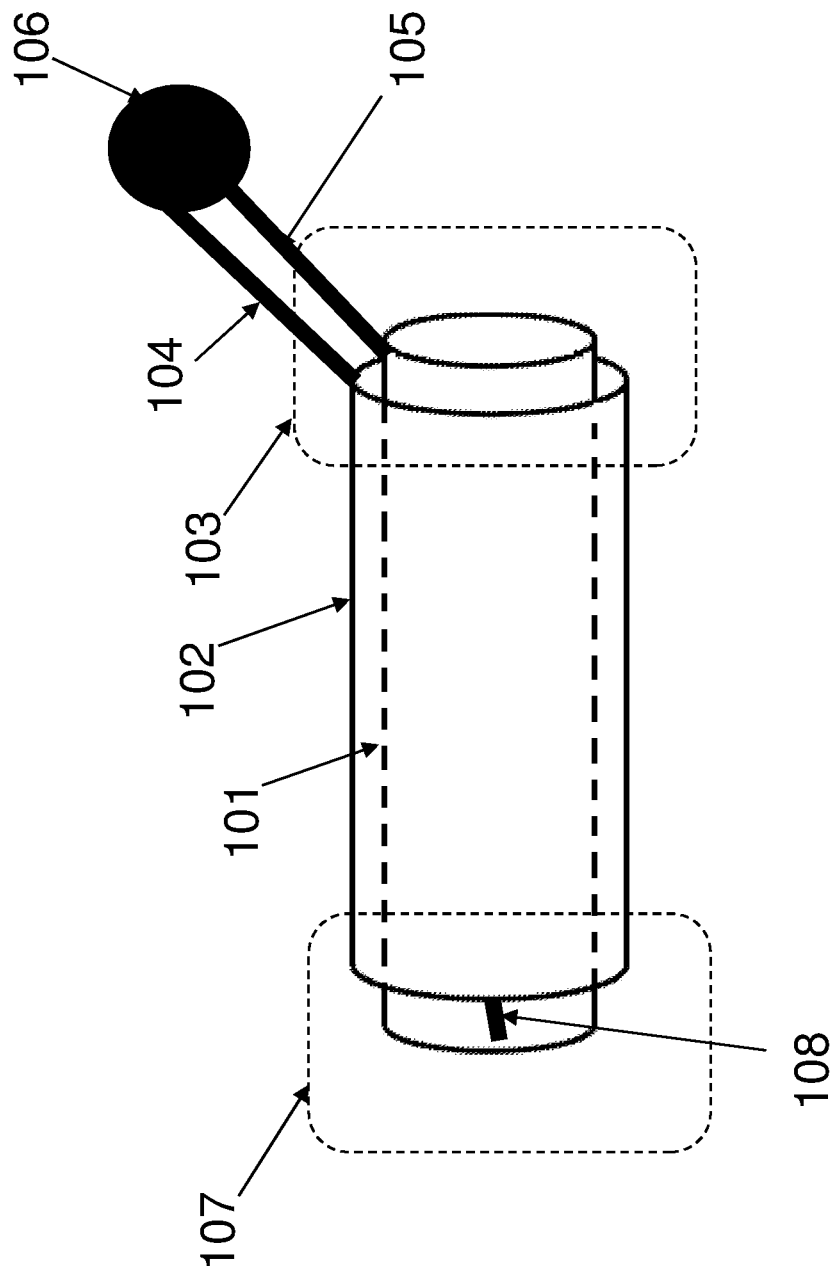
FIG. 9 is a schematic side view of an embodiment of the unbounded flexible pipe of the invention connected to a main power supply.

FIG. 9 show an embodiment of the unbounded flexible pipe of the invention connected to a main power supply 106. The unbounded flexible pipe has a plurality of layers, but only the carcass 101 and the electrically conducting armor later 102 are shown. The unbounded flexible pipe has a first end terminated in a first end-fitting indicated with the dotted lines 103 and a second end terminated in a second end-fitting indicated with the dotted lines 107. It should be understood that the unbounded flexible pipe generally has a length of from 20 m up to several hundred m or even 1, 2 or 3 km or longer. The distance between the two ends of the pipe can therefore be quite substantial. The unbounded flexible pipe comprises electrical connections 104, 105 arranged to apply a voltage over the electrically conductive layers 101, 102. The main power supply 106 is connected to the electrical connections 104, 105. It should be understood that the main power supply 106 advantageously can be turned on and of e.g. via a toggle switch optionally in dependence of the temperature of the fluid in the pipe and optionally automatic regulated by a not shown regulating unit. The electrically conductive layers 101, 102 are connected to each other in the second end-fitting 107 as indicated with the interconnection 108. This interconnection can for example be a toggle switch or a short circuiting arrangement.

Figure 10:
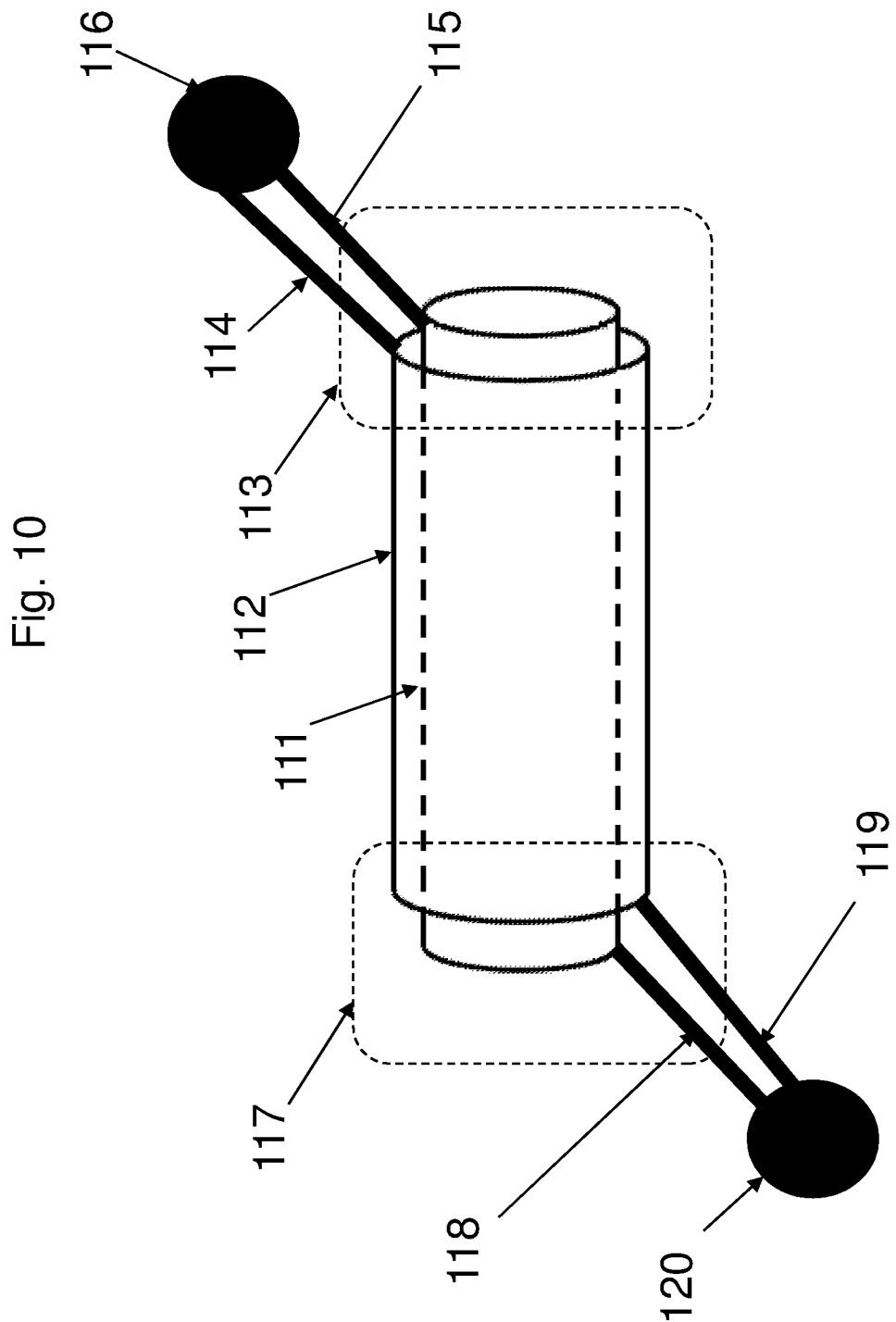
FIG. 10 is a schematic side view of an embodiment of the unbounded flexible pipe of the invention connected to a main power supply and a support power supply.

FIG. 10 show another embodiment of the unbounded flexible pipe of the invention connected to a main power supply 116. The unbounded flexible pipe has a plurality of layers, but only the carcass 111 and the electrically conducting armor later 112 are shown. The unbounded flexible pipe has a first end terminated in a first end-fitting indicated with the dotted lines 113 and a second end terminated in a second end-fitting indicated with the dotted lines 117. The unbounded flexible pipe comprises electrical connections 114, 115 arranged to apply a voltage over the electrically conductive layers 111, 112. The main power supply 116 is connected to the electrical connections 114, 115. At the second end of the pipe in the second end-fitting 117, the electrically conductive layers 111, 112 are connected to each other via a support power supply 120 connected to the respective electrically conductive layers 111, 112 via electrical connections 118, 119. The impressed potentials at the respective first and second end of the respective electrically conductive layer may for example be as described above.

Figure 11:
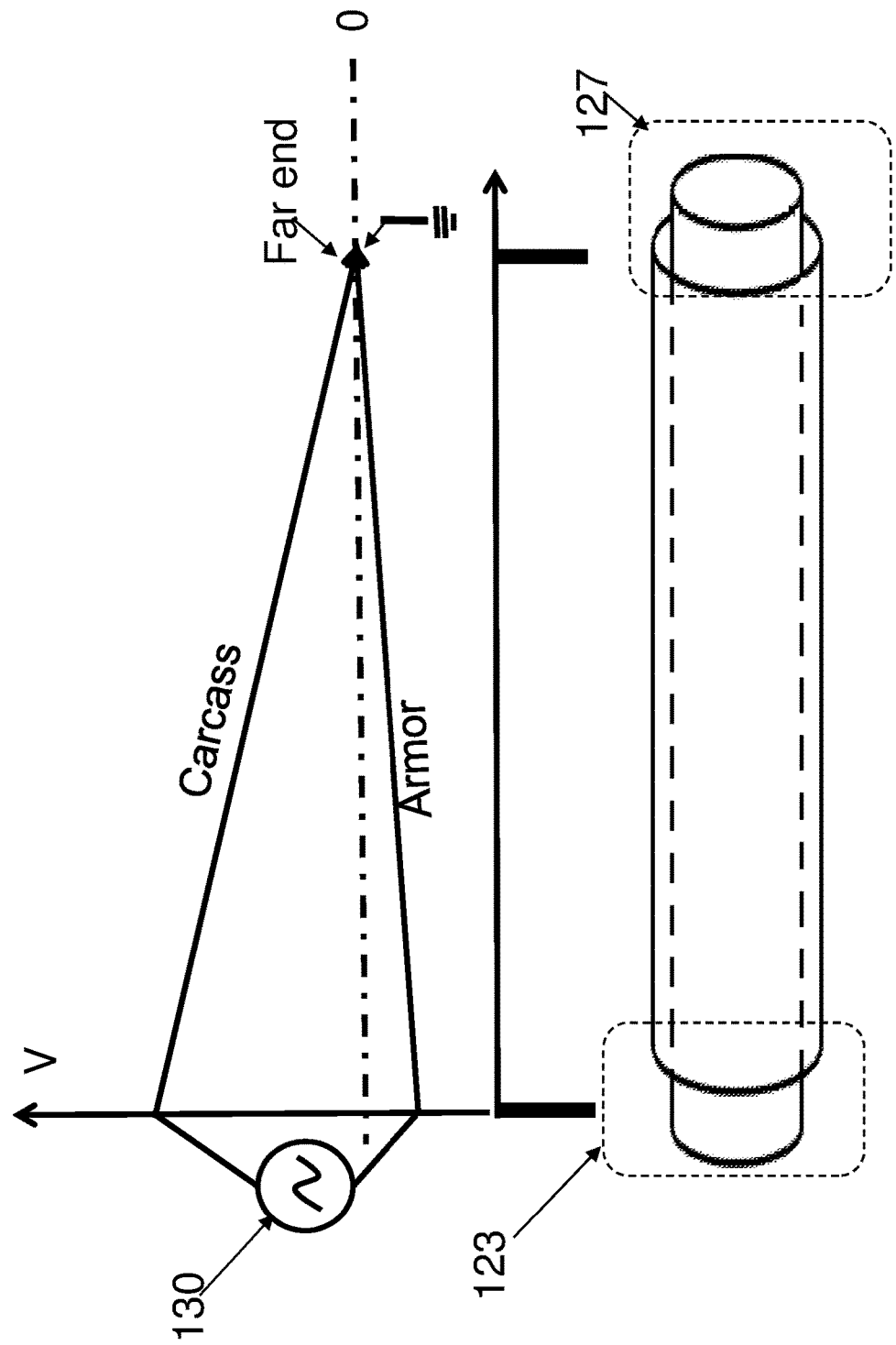
FIG. 11 is a schematic illustration of a voltage diagram of an embodiment of the offshore system of the invention.

FIG. 11 shows the power drop over respectively the electrically conductive carcass 121 and the electrically conductive armor layer 122. At the first end fitting 123 the electrically conductive carcass 121 and the electrically conductive armor layer 122 are connected to a power supply 130, which impress a voltage over the layers. At the far position—here the second end fitting 127 the electrically conductive carcass 121 and the electrically conductive armor layer 122 are interconnected and grounded such that the electrical potential at this position is zero. The electrical potential is shown in the diagram where the voltage is plotted in dependence of the position along the pipe. It can be seen that the voltage drop over the carcass 121 is much larger than the voltage drop over the armor layer 121, which means that most of the heat will be generated in the carcass.

What is claimed is:

1. An unbonded flexible pipe for transportation of fluids, the unbonded flexible pipe has a length along a longitudinal center axis, and a first and a second end, and a first end fitting connected to the first end, the unbonded flexible pipe comprises from inside and out an electrically conductive carcass, an electrically insulating innermost sealing sheath, at least one electrically conductive armor layer comprising at least one helically wound electrically conductive wire and an electrically insulating outer sealing sheath, at least the electrically conductive layers are mechanically terminated in the first end fitting and the pipe comprises electrical connections in the first end fitting arranged to apply a voltage over the electrically conductive layers which electrically conductive layers are electrically connected at a far position of the unbonded flexible pipe at a distance from the first end fitting of the unbonded flexible pipe to provide an electric circuit and wherein the electrically conductive carcass and the electrically conductive armor layer are selected such that a voltage drop $V_c$ over the electrically conductive carcass is larger than a voltage drop $V_a$ over the electrically conductive armor layer.

2. The unbonded flexible pipe of claim 1, wherein $V_c > 1.5$ times $V_a$.

3. The unbonded flexible pipe of claim 1, wherein the first end fitting comprises a bore extending through a front end in which the electrically conductive layers are mechanically terminated, and through a rear end of the first end fitting, the rear end of the first end fitting comprises a flange for being connected to a production site structure in fluid connection with a flow path thereof, the rear end of the first end fitting comprises an annular wall surface defining the rear end of the bore of the first end fitting, wherein at least a part of the annular wall surface is electrically insulated from the electrically conductive carcass.

4. The unbonded flexible pipe of claim 1, wherein an electric power blocking is arranged in the rear end of the bore of the end fitting.

5. The unbonded flexible pipe of claim 4, wherein the electric power blocking is a valve.

6. The unbonded flexible pipe of claim 4, wherein the electric power blocking is a sacrificial anode comprising a metal or a metal alloy which is less noble than the annular wall surface of the first end fitting.

7. The unbonded flexible pipe of claim 1, wherein the electrical connections arranged to apply a voltage over the electrically conductive layers are arranged to be connected to a main power supply for applying the voltage over the electrically conductive layers in said first end fitting, the main power supply is a dual power supply wherein one sub-power supply is connected over one of the electrically conductive layers and a zero potential and it adds a high potential to said one of the electrically conductive layers and another sub-power supply is connected over the other one of the electrically conductive layers and the zero potential and it adds a low potential to said other one of the electrically conductive layers.

8. The unbonded flexible pipe of claim 1, wherein the unbonded flexible pipe comprises electrical connections for applying a support power supply in the electric circuit at a distance from the main power supply.

9. The unbonded flexible pipe of claim 1, wherein the unbonded flexible pipe comprises two or more pipe length sections which are mechanically and electrically connected via respective intermediate end fittings, each pipe length section comprises from inside and out an electrically conductive carcass length section, an electrically insulating innermost sealing sheath length section, at least one armor layer length section comprising a length section of the at least one helically would electrically conductive wire and an electrically insulating outer sealing sheath length section, wherein the respective length sections of the conductive layers are electrically interconnected to provide the electric circuit.

10. The unbonded flexible pipe of claim 1, wherein the unbonded flexible pipe comprises a temperature sensor.

11. An offshore system comprising a production site structure and an unbonded flexible pipe suitable for transporting fluids from a subsea facility to the production site structure, the unbonded flexible pipe has a length along a longitudinal center axis, and a first and a second end, and a first end fitting connected to the first end, wherein the unbonded flexible pipe is connected to said production site structure via said first end fitting, the unbonded flexible pipe comprises from inside and out an electrically conductive carcass, an electrically insulating innermost sealing sheath, at least one electrically conductive armor layer comprising at least one helically wound electrically conductive wire and an electrically insulating outer sealing sheath, at least the electrically conductive layers are mechanically terminated in the first end fitting and the pipe comprises electrical connections in the first end fitting arranged to apply a voltage over the electrically conductive layers which electrically conductive layers are electrically connected at a far position of the unbounded flexible pipe at a distance from the first end fitting of the unbonded flexible pipe to provide an electric circuit and wherein the electrically conductive carcass and the electrically conductive armor layer are selected such that a voltage drop $V_c$ over the electrically conductive carcass is larger than a voltage drop $V_a$ over the electrically conductive armor layer.

12. The offshore system of claim 11, wherein the flow path of the production site structure comprises an inflow flow path section surrounded by an inflow flow path wall surface which in at least a length section is electrically insulated.

13. The offshore system as claimed in claim 11, wherein the system further comprises a main power supply for applying the voltage over the electrically conductive layers, the main power supply is electrically connected to at least one of the electrical connections to the electrically conductive layers in said first end fitting.

14. The offshore system as claimed in claim 11, wherein the system further comprises a main power supply for applying the voltage over the electrically conductive layers, the main power supply is electrically connected to both of the electrical connections to the electrically conductive layers in said first end fitting.

15. The offshore system as claimed in claim 11, wherein the system further comprises a main power supply for applying the voltage over the electrically conductive layers, the main power supply is a dual power supply wherein one sub-power supply is connected over one of the electrically conductive layers and a zero potential and it adds a high potential to said one of the electrically conductive layers and another sub-power supply is connected over the other one of the electrically conductive layers and the zero potential and it adds a low potential to said other one of the electrically conductive layers.

16. The offshore system as claimed in claim 11, wherein the system comprises a support power supply in the electric circuit arranged at a distance from the main power supply, the support power supply is arranged to impress an electrical potential difference between the electrically conductive layers at the far position of the unbounded flexible pipe such that the impressed electrical potential at the far position of each of the respective electrically conductive layers is negative where the electrical potential impressed by the main power supply at the first end of the unbounded flexible pipe to each of said respective electrically conductive layers is positive and positive where the electrical potential impressed by the main power supply at the first end of the unbounded flexible pipe to each of said respective electrically conductive layers is negative.

17. The offshore system as claimed in claim 11, wherein the electrically conductive armor layer and/or the electrically conductive carcass layer is grounded.

18. The offshore system as claimed in claim 11, wherein the inflow flow path comprises an inflow path section comprising an electric power blocking.

19. The offshore system as claimed in claim 18, wherein the electric power blocking is at least one bend of the inflow path section.

20. The unbonded flexible pipe of claim 2, wherein $V_c > 2$ times $V_a$.

21. The unbonded flexible pipe of claim 5, wherein the valve is a ball valve.

22. The unbonded flexible pipe of claim 5, wherein the valve is a gate valve.

23. The unbonded flexible pipe of claim 6, wherein the anode comprises magnesium, brass, aluminum, zinc or titanium.

* * * * *